United States Patent [19]

Gesslauer

[11] Patent Number: 4,599,166
[45] Date of Patent: Jul. 8, 1986

[54] OZONE DRINKING WATER PURIFICATION APPARATUS

[76] Inventor: Rudolf Gesslauer, Waldstr. 6, D-3501 Schauenburg, Fed. Rep. of Germany

[21] Appl. No.: 611,881

[22] Filed: May 18, 1984

[51] Int. Cl.⁴ .............................................. C02F 1/78
[52] U.S. Cl. .................................. 210/96.1; 210/110; 210/177; 210/192
[58] Field of Search ...................... 210/192, 96.1, 100, 210/105, 109, 110, 143, 177, 182, 205, 202, 203, 760

[56] References Cited

U.S. PATENT DOCUMENTS 3,699,776 10/1972 La Raus .......................... 210/192 X
3,726,404 4/1973 Troglione ........................ 210/192 X
3,784,008 1/1974 Troglione ........................ 210/192 X Primary Examiner—Thomas Wyse

[57] ABSTRACT

Ozone drinking water purification apparatus having a drinking water supply tank, a drinking water circulation line connected to the latter, and an ozone feed line connected to an ozone generator and leading into the circulation line, the apparatus being in the form of a completely pre-manufactured household appliance, having a connection for a raw water source, and being provided with a refrigeration machine associated with the supply tank and intended for the cooling of the drinking water (FIG. 1).

13 Claims, 3 Drawing Figures

OZONE DRINKING WATER PURIFICATION APPARATUS

The invention relates to an ozone drinking water purification apparatus of the kind defined in the generic part of claim 1.

Drinking water purification apparatus of this kind are know in many forms. They serve mainly for the complete disinfection of water, and they have many advantages over conventional apparatus operating with chlorine. They are used to some extent as large plants (German Patent Application No. 28 48 178) in conjuntion with communal drinking water supply systems, waste water disinfecting plants, swimming pools, or the like, and to some extent as small apparatus (German Patent Application P No. 32 08 912), which may also be transportable, for the purification of drinking water in small amounts, chiefly in regions where there is little drinking water or civilization.

In warmer regions, as for example in Arabian countries, in addition to drinking water purification in general, the problem often is that a water supply delivered or rendered safe for drinking becomes unpalatable because the water becomes too warm on account of the high temperatures, which can easily attain 40° C. and more, and/or it becomes foul or otherwise unusable. Such problems are encountered mainly in cases in which the drinking water supply line is not buried deeply enough, in which the drinking water is temporarily stored in supply tanks which are mounted on the roofs of single-family or multi-family dwellings, or in which water consumption is relatively low, so that the drinking water often remains standing over long periods of time in the supply lines or tanks. No solution of this problem has as yet been possible, so that the supply of drinking water, particularly in the regions mentioned above, still suffers from many deficiencies.

It is the object of the invention to create an ozone apparatus for the purification of water, which can be installed in any household, and which can be used for the additional purification of any raw water on hand.

For the solution of this problem, the characteristic features of patent claim 1 are provided.

The invention for the first time creates a purification plant which not only purifies the water, i.e., makes it potable by disinfection and the like, but at the same time cools it and thus makes it palatable and enjoyable. Since the apparatus of the invention serves mainly for processing a water supply which basically has a good potability, but has been spoiled and greatly warmed by long standing in the heat, it can be made in the form of a small compact appliance in the manner of a refrigerator or the like, or can be integrated into a refrigerator. Preferably, the system is provided with an automatic control which assures a certain supply of water in the reservoir and a preselected temperature in this water supply. Otherwise, the apparatus in the household needs only to be connected to the available raw water source and to the electric power line.

The invention is suitable not only for the purpose described above, but also, of course, for the equipment of camping vehicles, yachts or the like, in which drinking water supplies have to be carried for long periods of time.

Additional advantageous features of the invention will be found in the subordinate claims.

The invention will be further explained below in conjunction with the appended drawings of an embodiment.

Figure 1:
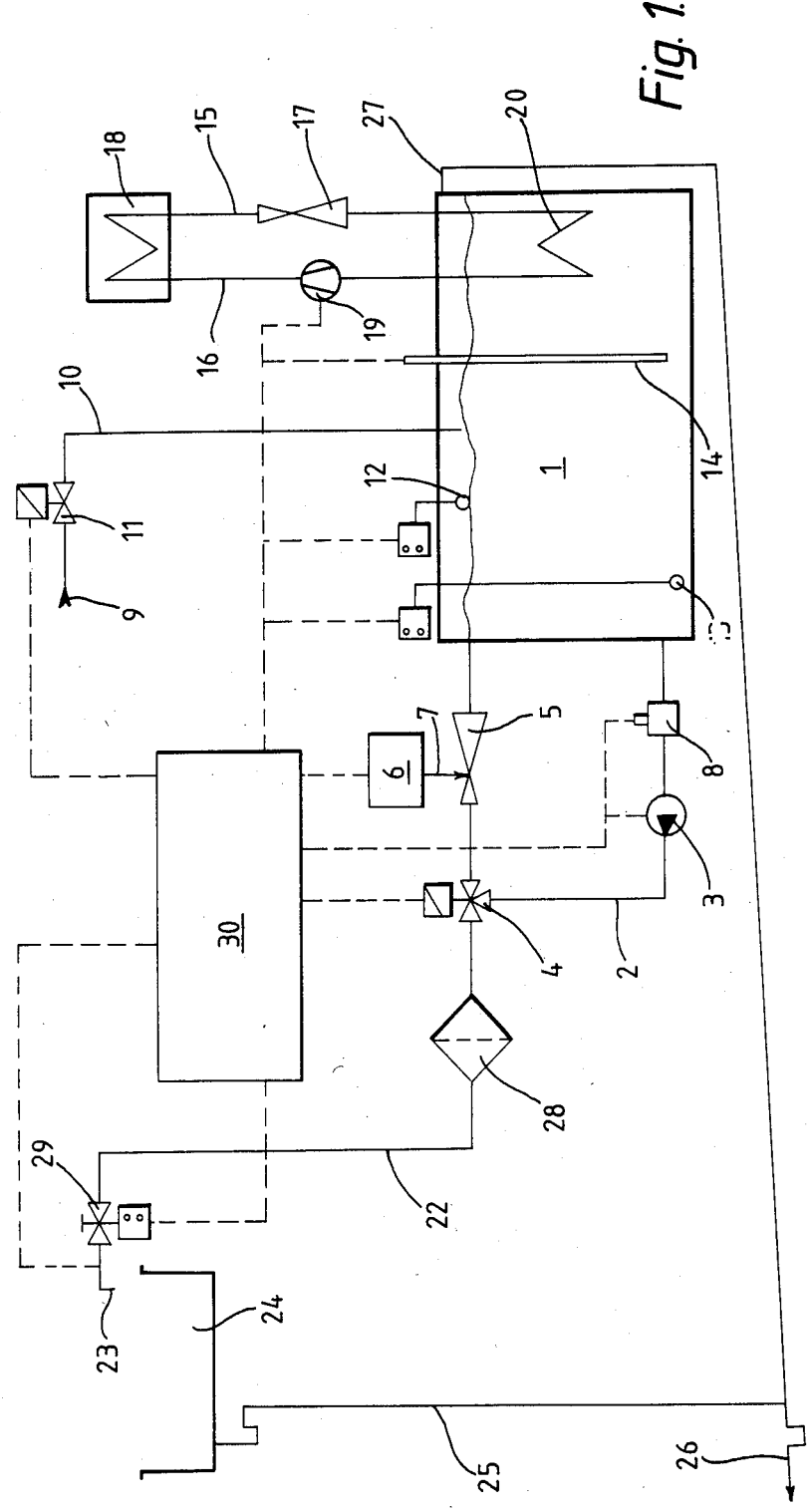
FIGS. 1 and 2 are flow diagrams of an embodiment.

The ozone water purification apparatus of the invention contains, as seen in FIG. 1, a drinking water tank 1 having a bottom outlet connected with the one end of a circulation line 2, and an upper inlet connected to the other end of the circulation line 2. Into the circulation line 2 are inserted, successively in the direction of flow, a circulation pump 3 which draws the drinking water in the tank 1 through the outlet and returns it through the upper inlet, a three-way valve 4, and an injector 5, the injector being connected to an ozone feed line 7 connected to an ozone generator 6. Lastly, the probe of a measuring device 8 monitoring the potability of the water extends into the circulation line 2, preferably at a point between the circulation pump 3 and the outlet of the supply tank 1, so that the probe is disposed on the low-pressure side of the circulation pump.

Furthermore, a connection 9 is associated with the supply tank; it is connected to a raw water feed line running to the supply tank 1 and serves for connection to a raw water source which is not shown, e.g., a pipeline which is connected to the local water mains or to a drinking water reservoir on the roof of a building. A shut-off valve 11 is connected into the feed line 10.

The supply tank 1 is furthermore provided with two level snesors, e.g., float switches 12 and 13, which are associated with a maximum and minimum water level, respectively, in the tank 1. The temperature of the drinking water is monitored by a temperature sensor 14.

The cooling of the drinking water is performed by a refrigeration machine 15, which is indicated only diagrammatically, and, in the manner of a conventional refrigeration machine, it contains a refrigerant circulation line 16 into which are inserted a compressor 17, a condenser 18, an expansion valve 19 and an evaporator 20 which is disposed in the drinking water supply in the supply tank 1, so that the refrigerant evaporated in the evaporator 20 removes from the drinking water the evaporation heat required for the evaporation and therefore cools the drinking water.

To the third connection of the three-way valve 4 there is connected, via a drinking water line 22, a faucet 23 which is disposed above a sink or the like whose drainage is connected by a drain line 25 to a waste water line 26 to which there is also connected an overflow 27 on the supply tank 1, this overflow preventing the overfilling of the supply tank 1. An active charcoal filter 28 and a shut-off valve 29 are inserted into the drinking water line 22.

The circulation pump 3, the three-way valve 4, the ozone generator 6, the shut-off valve 11, the float switches 12 and 13, the refigeration unit 15 and the shut-off valve 29 consist of controllable, preferably electrically contollable, devices, while the measuring device 8 and the temperature sensor 14 consist of elements or contain elements which indicate by a signal, preferably an electrical signal, the characteristic which they are monitoring. The three-way valve 4 and the shut-off valves 11 and 29 consist for this purpose preferably of solenoid valves, while the measuring device 8 preferably includes a probe extending into the circulation line for measuring the redox potential. The temperature sensor 14 can consist of a thermoelectric element or the like. The above-named controllable elements and devices are connected by control lines represented in broken lines to a central, preferably electronic, control apparatus 30, which can be made in the manner of a microprocessor and it conrols the above-described ozone drinking water purification system automatically such that only potable water can be taken from the faucet 29.

The manner of operation of the above-described drinking water purification apparatus is as follows:

The two level sensors 12 and 13 and the control unit 30 provide for keeping the supply tank 1 always filled with water at least up to a minimum level. If the water level drops below the minimum, the shut-off valve 11 is opened, so that more raw water flows in through the feel line 10, until the maximum level controlled by the float switch 12 is reached and the shut-off valve 11 is closed again.

The measuring device 8 simultaneously monitors the quality of the water. Since the so-called "redox potential" of water is known to increase as the degree of pollution of the water, expressed as the count of the harmful bacteria and germs contained therein, decrease, and therefore makes it easy to monitor water quality, the measuring device preferably contains a probe for measuring the redox potential. The control apparatus 30 is set for a preselected redox potential of, for example, 700 mV, at which absolute potable water quality is reached. If the redox potential definitely drops below this value, an operating pulse is produced, which is delivered to the circulation pump 3, the ozone generator 6 and the shut-off valve 29, and causes the circulation pump 3 and the ozone generator 6 to be turned on, and the shut-off valve 29 to be shut off, so that no water can be taken from the faucet 23.

After the circulation pump 3 is turned on, the water that is in the supply tank 1 is circulated through the circulation line 2. At the same time, ozone is produced by means of an ozone generator 6, and is fed to the injector 5 and purifies the water flowing through the circulation line 2 until it can again be qualified as potable. When the measuring device 8 then announces that potability has been restored, the circulation pump 3 and the ozone generator 6 are shut off, while at the same time the shut-off valve is changed to the open position so that water can again be taken from the water faucet 23. At the same time, depending on the arrangement of the water faucet 23 relative to the supply tank 1, provision can additionally be made so that, when the water faucet 23 is opened, the circulation pump 3 is turned on, and the three-way valve 4 is changed so that the water delivered by the circulation pump 3 is pumped into the drinking water line 22, while the drinking water is freed of any ozone residues by means of the active charcoal filter 28, and at the same time its taste is improved.

Lastly, the control apparatus also controls the refrigeration unit 15. If a preselected temperature of, for example, 15° C. monitored by the temperature sensor 14 is exceeded, the refrigeration unit 15 is operated until the preselected temperature is again reached.

Figure 2:
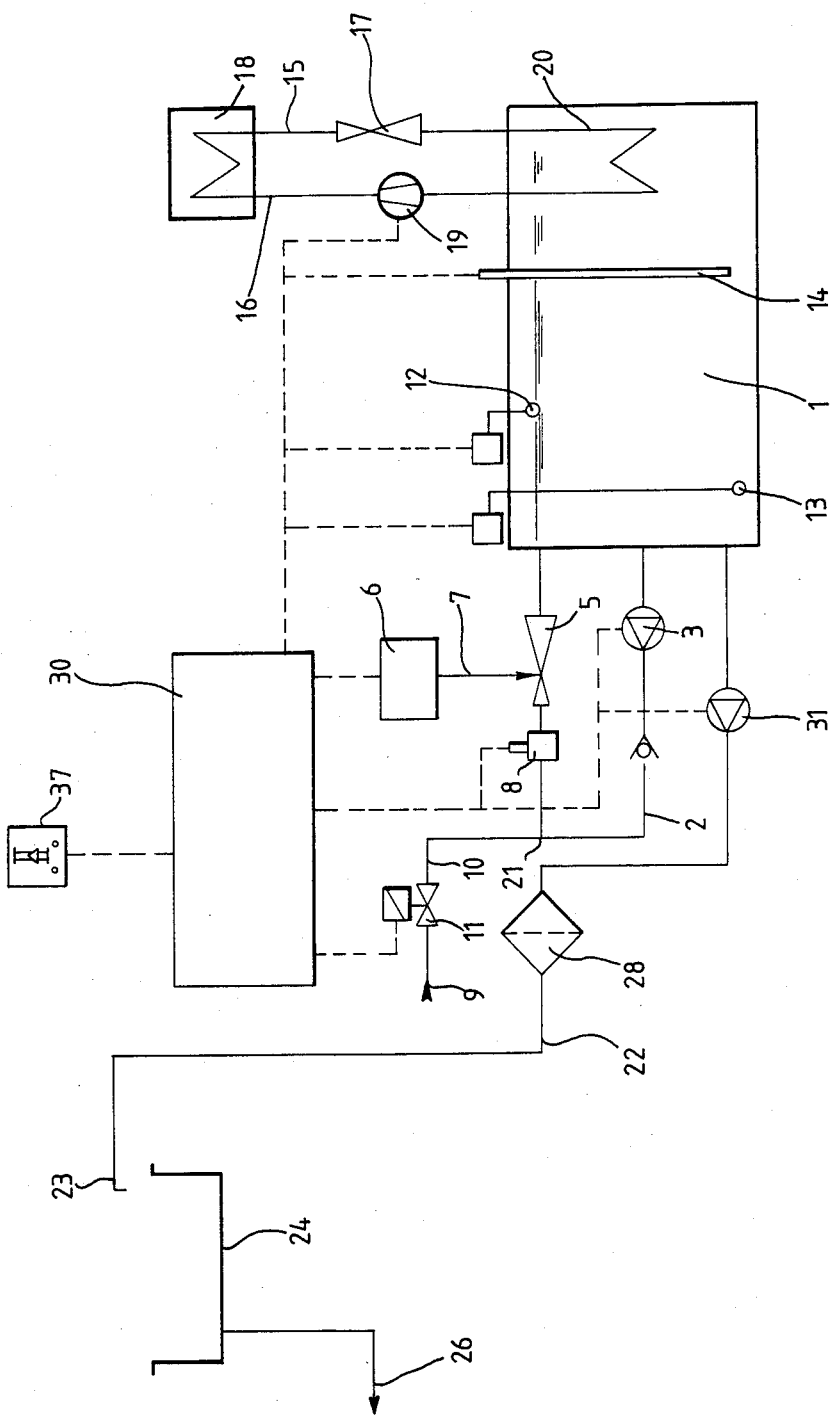
Figure 3:
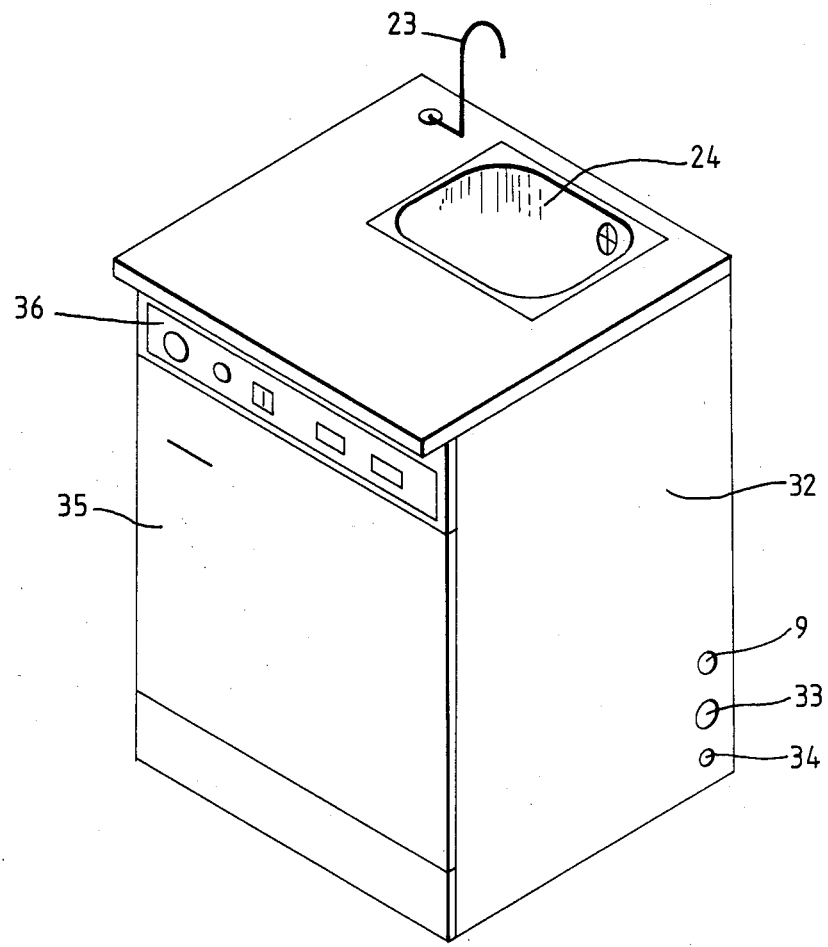
FIG. 3 shows the purification and refrigerating apparatus in the form of a kitchen appliance.

In the embodiment shown in FIG. 2, in which equal parts are provided with the same reference numbers, the three-way valve 4 in the circulation line 2 is replaced by a simple tee 21 which is connected to the raw water supply line 10. Furthermore, the measuring apparatus 8 is inserted into circulation line 2 between the tee 21 and the injector 5. Also, the drinking water line 22 is connected not to the circulation line 2, but to another outlet from the supply tank 1 and to a drinking water pump 31 of its own. The shut-off valve is lacking, and the water faucet 23 is simply a tap from which the drinking water can be taken, when the drinking water pump 31 is turned on, by means of a water-drawing detector switch 37.

The embodiment represented in FIG. 2 operates in substantially the same manner as the one in FIG. 1. The difference is that the switching pulse produced when the redox potential drops below the preselected redox potential the drinking water pump 31, locking up the latter, so that no water can be drawn even by operating the water-drawing detector switch 37. The drinking water pump 31 is not unlocked until the measuring device 8 announces the restoration of potable water quality and turns off the circulation pump and the ozone generator 6. Another difference is that the feed of raw water is performed through the circulation line 2 and the measuring device 8 so that the purification of the drinking water will begin as soon as raw water is fed in, instead of waiting until drinking water is drawn.

It is desirable to design the drinking water purification apparatus of the invention as a completely premanufactured household appliance fully enclosed within a shell 32 (FIG. 2[3?]) on which only the connection 9, a connection 33 to the waste water line 26 and to a drain, and a connection 34 for the power supply are external, and which contains in its top working platform the sink 24 and the water tap 23. Furthermore, the shell 32 can best be designed in the manner of a domestic appliance, such as a refrigerator for example, and can be provided with a door 35 on its front so as to permit access to the apparatus. In this manner a compact, attractively styled appliance is obtained, which can be set up in any household that needs it, and can be used for the preparation of clean, cool, and therefore enjoyable drinking water.

On its front, the shell 32 can additionally have a control panel 36, which can contain, for example, the detector switch 37 and also means for indicating the state of operation, the water temperature and the redox potential. The dectector switch 37 and the indicating means are connected in a manner not represented in detail, but in a manner that is known in itself, to the pertinent parts of the purification apparatus of FIG. 1.

The capacity of the supply tank 1 is preferably matched to the average drinking water consumption of a family, amounting, for example, to twenty liters, and it is therefore made of sufficiently small size so that, after the amount of raw water predetermined by the float switches 12 and 13 has been fed in, not too much time will be lost in purifying and cooling the amount of water delivered, if the ozone generator 6 and the refrigeration unit 15 have a comparatively low capacity for reasons of economy. Alternatively, provision can be made for limiting the amounts of raw water than can be fed in by bringing the float switches 12 and 13 closer together. In this case, even the amount of drinking water which can be taken from the water faucet 23 in one draft would be limited.

A plurality of known devices, preferably those named in German Patent Application P No. 32 08 895, are available for the injector 5 and the ozone generator 6, it being desirable to associate with the ozone generator 6 an air drying in accordance with German Patent Application P No. 33 04 683. These systems proposed by the same applicant make possible an especially compact, space-saving and highly effective generation and injection of the ozone required for the purification.

The invention is not limited to the embodiment described, which can be modified in many ways. This applies on the one hand to the described arrangement and configuration of the various parts of the purification system, e.g., the refrigeration machine 15, the measuring apparatus 8, the temperature sensor 14 and the shut-off valves 11 and 29, the drinking water pump 31 or three-way valve 4, as the case may be, and on the other hand to the controls described, which could be different, and could also be semi-automatic for example. For example, the shut-off valve 29 could be omitted and a lock could be instead associated with the three-way valve and permit it to be switched to the drinking water line 22 only if the water qualifies as potable.

Lastly, if need be, a filter can be associated with the connection 9 or with the feed line 10 in order to keep particles floating in the raw water out of the supply tank 1.

The supply tank 1 is best provided with good thermal insulation so as to prevent appreciable warning of the refrigerated water by the ambient atmosphere.

I claim:

1. An ozone drinking water cooling and purification apparatus constructed as a pre-manufactured household appliance and comprising: a supply system including a tank for storing water, cooling means for cooling said water within said tank, a measuring device for monitoring the redox potential of said water at a preselected location of said supply system, an ozone generator, an ozone injector coupled with said ozone generator to inject ozone into said water at another preselected location of said supply system for purification of said water and for increasing the redox potential thereof up to a preselected drinking water redox potential whenever said measuring device signals that the water redox potential is below said preselected water redox potential, faucet means for taking water from said tank, and automatic preventing means connected to said redox potential measuring device and controlled therby for preventing water not having at least said preselected drinking water redox potential from being taken from said tank via said faucet means.

2. Ozone drinking water cooling and purification apparatus according to claim 1 wherein said supply system has a circulation line connected with said tank, said circulation line including said injector and a circulation pump.

3. Ozone drinking water cooling and purification apparatus according to claim 2, comprising a drinking water line connected between said faucet means and said tank and a drinking water pump which is provided within said drinking water line, said drinking water pump being controllable such that said water may be taken from said tank via said faucet means only when said water has at least said preselected drinking water quality.

4. Ozone drinking water cooling and purification apparatus according to claim 3, wherein a charcoal filter is disposed within the drinking water line.

5. Ozone drinking water cooling and purification apparatus according to claim 3, wherein a control means coupled to said measuring device is provided for controlling said ozone generator, said cooling means, said preventing means, and said drinking water pump.

6. Ozone drinking water cooling and purification apparatus according to claim 2, wherein said measuring device is mounted into said circulation line.

7. Ozone drinking water cooling and purification apparatus according to claim 2, wherein said circulation line includes a controllable three-way valve, said valve having a connection which is connected to a drinking water line leading to said faucet means.

8. Ozone drinking water cooling and purification apparatus according to claim 7, wherein a charcoal filter is disposed within the drinking water line.

9. Ozone drinking water cooling and purification apparatus according to claim 7, wherein a control means coupled to said measuring device is provided for controlling said ozone generator, said cooling means, said preventing means, and said three-way valve.

10. Ozone drinking water cooling and purification apparatus according to claim 7, wherein said preventing means is a controllable shut-off means within said drinking water line.

11. Ozone drinking water cooling and purifcation apparatus according to claim 1, comprising a connection connectable to a raw water source, said last named connection being connected to a raw water feed line leading raw water from said source into said tank, a controllable shut-off means within said raw water feed line and a fill level control provided within said tank.

12. Ozone drinking water cooling and purification apparatus according to claim 11, wherein said supply system has a circulation line connected with said tank and said raw water feed line is coupled to said circulation line.

13. Ozone drinking water cooling and purification apparatus according to claim 11, wherein a control means coupled to said measuring device is provided for controlling said ozone generator, said cooling means, said preventing means, said shut-off means and said fill level control.

* * * * *